United States Patent
Poudrier (10) Patent No.: US 11,097,759 B1
(45) Date of Patent: Aug. 24, 2021

(54) VERSATILE ARTICLE SUPPORT DEVICE

(71) Applicant: Alan S Poudrier, Niceville, FL (US)

(72) Inventor: Alan S Poudrier, Niceville, FL (US)

( * ) Notice: Subject to any disclaimer, the term of this patent is extended or adjusted under 35 U.S.C. 154(b) by 4 days.

(21) Appl. No.: 16/537,593

(22) Filed: Aug. 11, 2019

Related U.S. Application Data (63) Continuation-in-part of application No. 16/125,672, filed on Sep. 8, 2018, now Pat. No. 10,376,045.

(51) Int. Cl.
| | |
|---|---|
| *B65D 85/68* | (2006.01) |
| *B62B 3/04* | (2006.01) |
| *B25H 3/04* | (2006.01) |
| *B62B 3/10* | (2006.01) |
| *B62B 3/02* | (2006.01) |
| *B05B 13/02* | (2006.01) |
| *B62B 5/00* | (2006.01) |

(52) U.S. Cl.
CPC ............ *B62B 3/04* (2013.01); *B05B 13/0285* (2013.01); *B25H 3/04* (2013.01); *B62B 3/02* (2013.01); *B62B 3/10* (2013.01); *B62B 5/0083* (2013.01); *B62B 2202/90* (2013.01)

(58) Field of Classification Search
CPC .... B62B 3/04; B62B 3/02; B62B 3/10; B62B 5/0083; B25H 3/04; B05B 13/0285
See application file for complete search history.

(56) References Cited

U.S. PATENT DOCUMENTS

| | | | | |
|---|---|---|---|---|
| 3,955,511 A | * | 5/1976 | Bak | A47B 45/00 108/137 |
| 4,934,015 A | * | 6/1990 | Mink | A47L 4/04 15/268 |
| 5,476,282 A | * | 12/1995 | Dahl | B62B 1/002 280/47.18 |
| 5,570,988 A | * | 11/1996 | Gallaway | B62B 5/0003 414/343 |
| 5,660,637 A | * | 8/1997 | Dodge | B05B 13/0285 118/500 |
| 5,720,817 A | * | 2/1998 | Taylor | B05B 13/0285 118/500 |
| 5,778,953 A | * | 7/1998 | Braddock | B23D 47/025 144/286.1 |
| 6,123,208 A | * | 9/2000 | Haenszel | A47B 45/00 108/55.1 |
| 6,394,267 B1 | * | 5/2002 | Craig | B65D 88/528 206/321 |
| 6,422,405 B1 | * | 7/2002 | Haenszel | A47B 45/00 108/55.1 |
| 6,561,745 B2 | * | 5/2003 | Rountree | B62B 1/10 280/47.27 |
| 6,811,038 B1 | * | 11/2004 | Sanderson | A47B 81/00 211/13.1 |
| 6,837,934 B1 | * | 1/2005 | Patrykus | B05B 13/0285 118/500 |

(Continued)

*Primary Examiner* — Kimberley S Wright
(74) *Attorney, Agent, or Firm* — Peter Loffler (57) ABSTRACT

A versatile transport rack uses a rectangular shaped horizontal frame and one or more vertical frames that extend upwardly therefrom. Hinge pin receiver pairs are attached to the vertical frame and receive door pin pairs of a vehicle door. Either castors or axle-based wheel sets are removably attached to the horizontal frame in order to move the device about. Plates having appropriately placed templates are attached to the horizontal frame and/or the hinge pin receivers to hold various implements.

19 Claims, 6 Drawing Sheets

(56) References Cited

U.S. PATENT DOCUMENTS

| | | | | |
|---|---|---|---|---|
| 6,966,574 B1* | 11/2005 | Dahl | ................... | B62B 1/002 |
| | | | | 280/47.18 |
| 7,784,802 B2* | 8/2010 | White | ................ | E04F 21/0023 |
| | | | | 280/79.11 |
| 8,475,109 B2* | 7/2013 | Torrison | ................ | B62B 5/0485 |
| | | | | 414/444 |
| 9,198,269 B2* | 11/2015 | Bristow | ................... | H05F 3/02 |
| 9,701,482 B2* | 7/2017 | Lawless | ............. | B60B 33/0021 |
| 9,903,527 B1* | 2/2018 | Wiborg | ................. | F16M 11/20 |
| 10,376,045 B1* | 8/2019 | Poudrier | ................ | B62B 3/002 |
| 2004/0150148 A1* | 8/2004 | Luca | ..................... | B62D 65/18 |
| | | | | 269/17 |
| 2008/0087792 A1* | 4/2008 | Evitt, Sr. | ................. | F16M 3/00 |
| | | | | 248/676 |
| 2008/0237168 A1* | 10/2008 | Harpole | ................ | B65D 19/12 |
| | | | | 211/195 |
| 2009/0096144 A1* | 4/2009 | White | ................... | B62B 3/108 |
| | | | | 269/17 |
| 2013/0286529 A1* | 10/2013 | Bristow | ................... | H05F 3/02 |
| | | | | 361/220 |
| 2014/0217045 A1* | 8/2014 | Nesin | ....................... | A47F 7/00 |
| | | | | 211/85.8 |
| 2017/0305452 A1* | 10/2017 | King | ......................... | B62B 1/12 |
| 2019/0331291 A1* | 10/2019 | Poudrier | ............. | B25H 1/0007 |

* cited by examiner

VERSATILE ARTICLE SUPPORT DEVICE

This application is a Continuation-In-Part of U.S. patent application Ser. No. 16/125,672, filed on Sep. 8, 2018, which is a Continuation-In-Part of U.S. patent application Ser. No. 15/962,262, filed on Apr. 25, 2018, each of which is incorporated by reference herein in its entirety.

BACKGROUND OF THE INVENTION

1. Field of the Invention

The present invention relates to a ground supported rack that rests on the ground surface or rolls on either axle-based wheels, casters, or a combination, the rack having a vertical support so that the rack can hold various items supported by either its horizontal base or the vertical support, or both.

2. Background of the Prior Art

Many people who enjoy outdoor activities own sport utility vehicles (SUVs) with doors that can be removed in order to give occupants more outdoor pleasure while riding in the vehicle. The doors, once removed, need to be stored in appropriate fashion in order to prevent damage to them. As such doors are relatively bulky and heavy, such storage is not an easy task. Laying the doors on a ground surface is not satisfactory as that can cause damage to the door, especially to its finish. Therefore, some devices are available for storing the doors, but such devices do not offer any purpose beyond this singular purpose and are not otherwise of particular utility when not serving in their intended purpose and are they themselves relatively large and bulky.

What is needed is a device that is designed to easily and effectively hold a vehicle door that is removed from the vehicle so as to prevent the door from becoming damaged. Such a device must be able to easily move about the ground level when the doors are being held by the device. Such a device must have substantial utility beyond the task of holding and moving vehicle doors about so that the device is multipurpose in its functioning. Such a device must provide support for a variety of articles as defined by the users' needs and also be relatively small and compact when not in use for ease of storage or transport of the device.

SUMMARY OF THE INVENTION

The versatile article support device of the present invention addresses the aforementioned needs in the device by providing an article rack that is specifically configured to hold a set of vehicles doors that are removed from a vehicle and easily move the doors about a ground surface as needed. The versatile article support device allows for quick and easy donning of the doors onto the device and doffing therefrom without the need for any specialized tools or other implements. The versatile article support device has substantial versatility beyond its door storing and transport function and can be quickly configured for a wide variety of diverse tasks. The versatile article support device is of relatively simple design and construction, being produced using standard manufacturing techniques, so that the device is relatively inexpensive to produce so as to be economically attractive to potential consumers for this type of device. Use and maintenance of the versatile article support device is simple and straightforward. The versatile article support device is lightweight and compact in design and is collapsible for ease of storage and transport of the device.

The versatile article support device of the present invention is comprised of a horizontal frame that has a pair of coextensive side rails joined by at least two spaced apart cross rails. The cross rails have a square cross-section. The horizontal frame has an upper surface and a corresponding lower surface. A vertical frame has a base rail and a first riser rail extending upwardly from the base rail and a second riser rail extending upwardly from the base rail coextensively with the first riser rail. A top rail extends between the first riser rail and the second riser rail at the top of the vertical frame. The base rail is attached to one of the cross rails on the upper surface of the horizontal frame. A first of hinge pin receiver has a first opening and is attached to the first riser rail while a second of hinge pin receiver has a second opening and is attached to the first riser rail below the first hinge pin receiver. The first opening of the first hinge pin receiver and the second opening of the second hinge pin receiver align with one another so that an axis passes through the aligned first opening and the second opening. The axis is also parallel with the pair of risers. The first hinge pin receiver and the second hinge pin receiver may each attached to the first riser rail so as to be positioned between the first riser rail and the second riser rail (inner facing surface of the first riser rail) or may be attached on an outer facing surface of the first riser rail. A wheel implement is removably attached to the lower surface of the horizontal frame. The wheel implement is comprised of a first caster that is attached to the first side rail and a second caster that is attached to the second side rail directly across from the first caster. Alternately, the wheel implement is comprised of an axle tube and a U-shaped receiver that is attached to the axle tube such that the receiver receives one of the cross rails. A first wheel is rotatably attached to a first end of the axle tube (to an axle disposed within the axle tube) while a second wheel is rotatably attached to a second end of the axle tube (again, to the axle proper). A pair of extensions rises upwardly from the axle tube and a cross bar extends between the pair of extensions and is bent inwardly toward the axle tube. The extensions and the receiver are radially offset from one another by 90 degrees. The side rails are each made from a first section and a second section that is removably attached to the first section. A first base plate may be removably attached to the upper surface of the horizontal frame. A second base plate may be removably attached to either the first hinge pin receiver or the second hinge pin receiver.

BRIEF DESCRIPTION OF THE DRAWINGS

Similar reference numerals refer to similar parts throughout the several views of the drawings.

DESCRIPTION OF THE PREFERRED EMBODIMENT

Referring now to the drawings, it is seen that the versatile article support device of the present invention, generally denoted by reference numeral 10, is comprised of a generally rectangular horizontal frame 12 that has a pair of coextensive side rails 14 joined by a series of cross rails 16 that are attached to the side rails 14 in any appropriate manner. At least the cross rails 16 are made from a tubular stock (metal, plastic, etc.) of square cross-section. The side rails 14 need not necessarily be of square cross-section, however, for ease of manufacturing of the device, may in fact so be and may be made from the same or similar material used to form the cross rails 16. The horizontal frame 12 has an upper surface 18 and an opposing lower surface 20.

A generally rectangular-shaped vertical frame 22 has a base rail 24 from which a pair of riser rails 26 extend upwardly from either end thereof, in spaced apart and parallel fashion. A top rail 28 connects the upper ends of the two riser rails 26. The various rails 24, 26 and 28 are made from the same or similar material used to make the components of the horizontal rail 12 and are connected to one another at their respective locations in any appropriate manner. As seen, a pair of hinge pin receives 30 is attached to at least one or possibly both of the riser rails 26 in any appropriate fashion (such as via the illustrated brackets 32). As seen, each pair of hinge pin receivers 30 is a body member that has a pin opening 34 therethrough on one or both ends of the body member. When a pair of the hinge pin receivers 30 is attached to one of the riser rails 26, the hinge pin receivers 30 align with one another and the pin openings 34 likewise align with one another and face in a vertical orientation when attached to the horizontal frame 12 as discussed below. The aligned pin openings 34 receive a pair of door pins from a door D of a vehicle in order to hold the door thereby. The hinge pin receivers 30 are height adjustable on the vertical frame 22.

The vertical frame 22 is attached to the horizontal frame 12 by positioning the vertical frame 22 on the upper surface 18 of the horizontal frame 12 such that the base rail 24 of the vertical frame 22 sits atop one of the cross rails 16 of the horizontal frame 12. Appropriate bolts 36 or similar implements are passed through openings 38 on the base rail 24 that align with corresponding openings 40 on the cross rail 16. The vertical frame 22 is now secured to the horizontal frame 12 and is oriented substantially perpendicular to the horizontal frame 12 and as previously stated, the axis passing through an aligned pin opening 34 pair is likewise oriented in generally perpendicular fashion with respect to the horizontal frame 12. The vertical frame 22 can be attached to any desired cross rail 16 of the horizontal frame 12 and more than one vertical frame 22 can be attached to the horizontal frame 12, each cross rail 16 capable of supporting one vertical frame 22.

An appropriate wheel implement is attachable to the versatile article support device 10. As seen, a pair of caster assemblies 42 are provided and are attached to the lower surface 20 of the horizontal frame 12. Specifically, each caster assembly 42 is attached to one of the side rails 14 at an appropriate location such as at one of the corners of the horizontal frame 12, each caster assembly 42 being located directly opposite the other of the caster assembly 42 of the pair. Attachment of the caster assembly 42 to the horizontal frame 12 is in appropriate fashion such as via appropriate bolts 36 or similar implements that pass through aligned openings 44 on the horizontal frame 12 and on the caster plate 46 of the caster assembly 42 (opening not shown). More than one pair of caster assemblies 42 can be attached to the horizontal frame 12 and the caster assemblies 42 can be attached other than proximate the corners of the horizontal frame 12.

Figure 1:
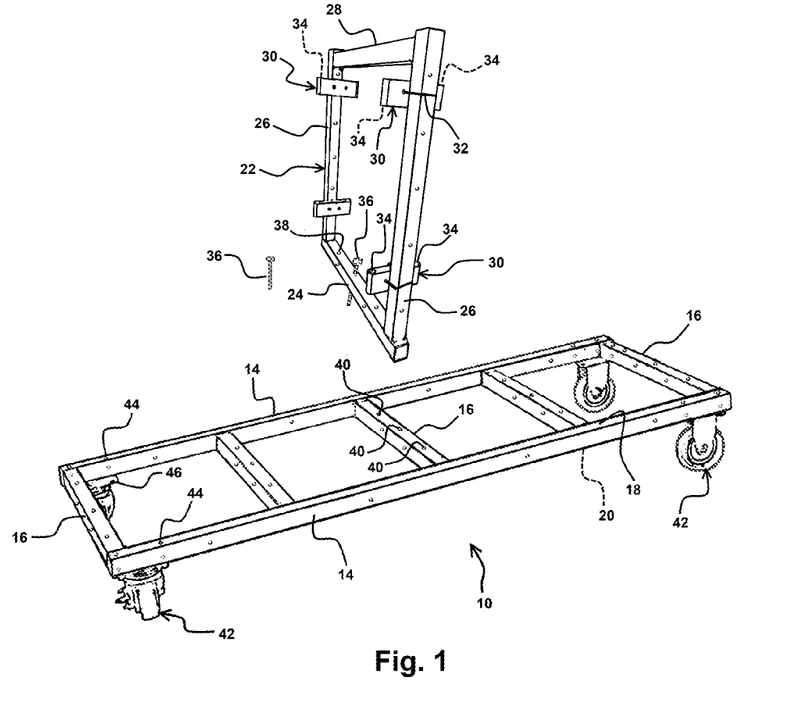
FIG. 1 is a perspective view, partially disassembled, of the versatile article support device of the present invention employing a set of castors.
Figure 2:
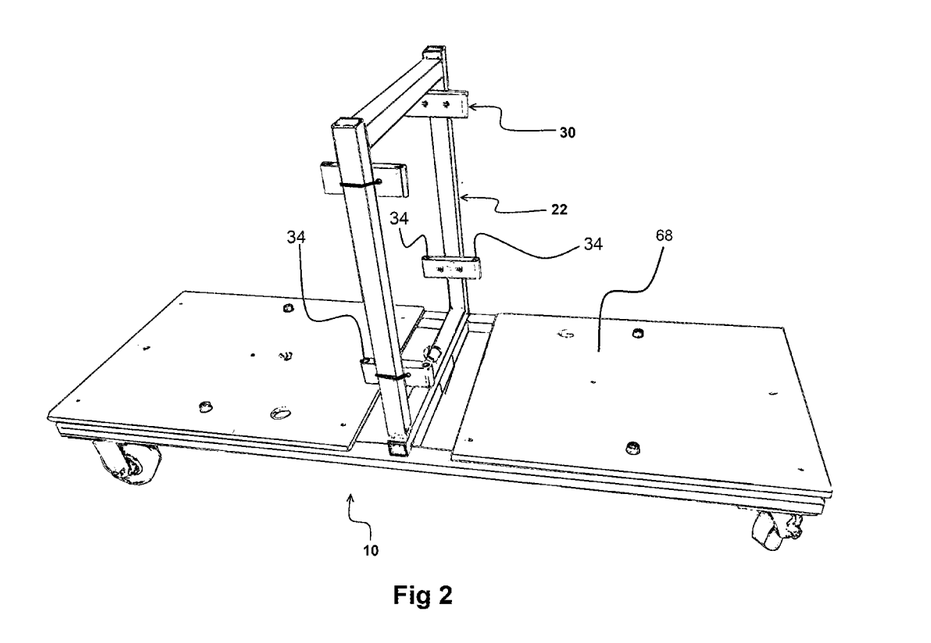
FIG. 2 is a perspective view of the versatile article support device employing the set of castors and a pair of base plates.
Figure 3:
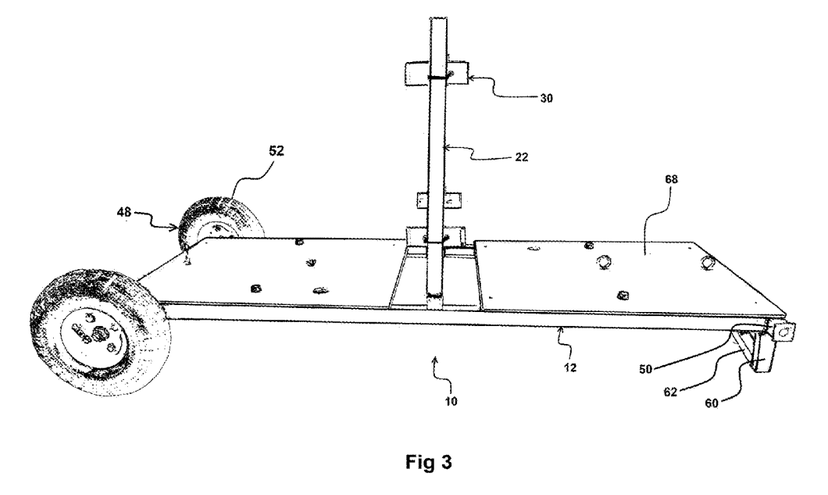
FIG. 3 is a perspective view of the versatile article support device employing a wheel set at one end and a landing skid at an opposing end.
Figure 4:
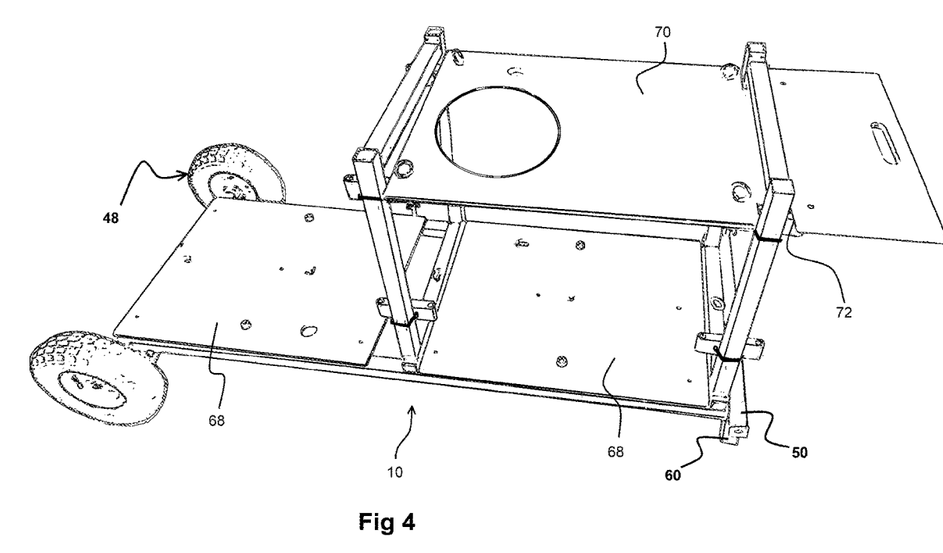
FIG. 4 is a perspective view of the versatile article support device utilizing both and upper base plate and lower base plates.
Figure 5:
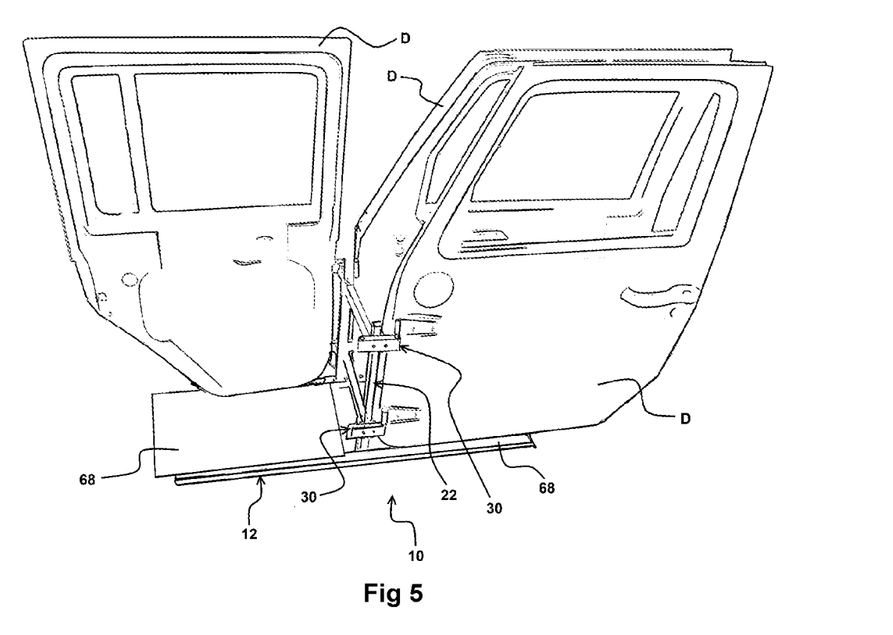
FIG. 5 is an environmental view of the versatile article support device holding vehicle doors.
Figure 6:
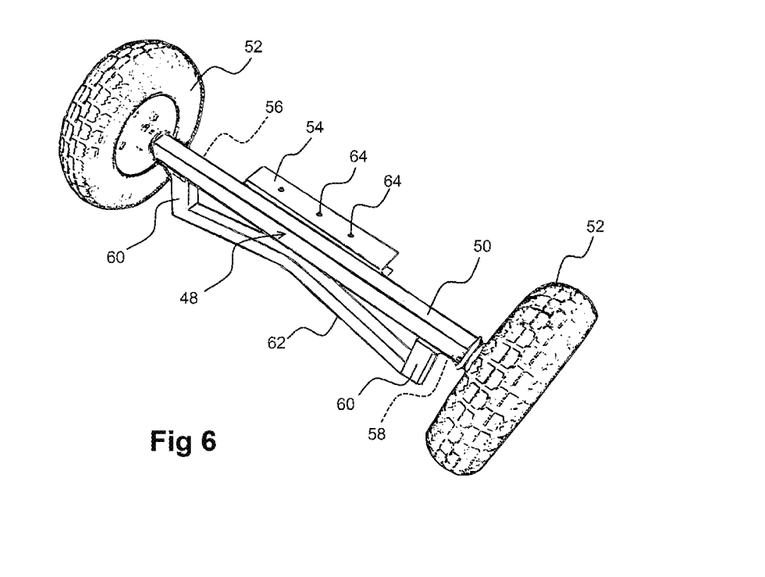
FIG. 6 is a perspective view of a wheel set used with the versatile article support device.
Figure 7:
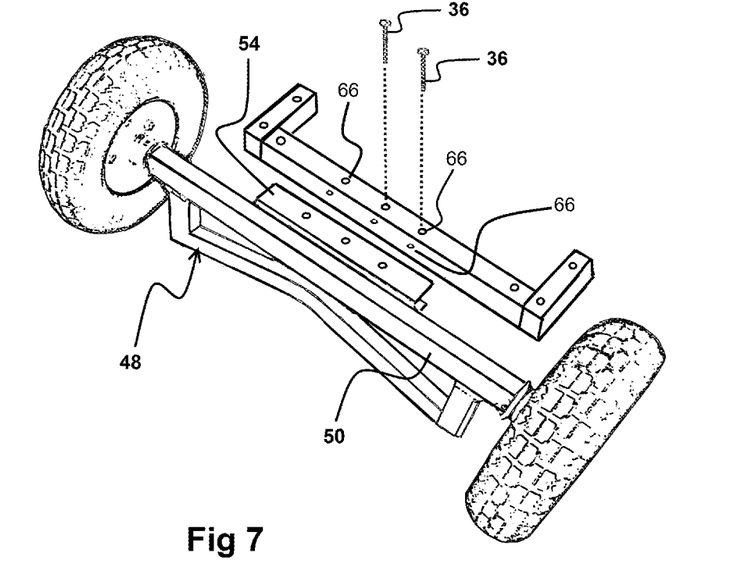
FIG. 7 is a perspective view of the wheel set of FIG. 6 being attached to the horizontal frame.
Figure 8:
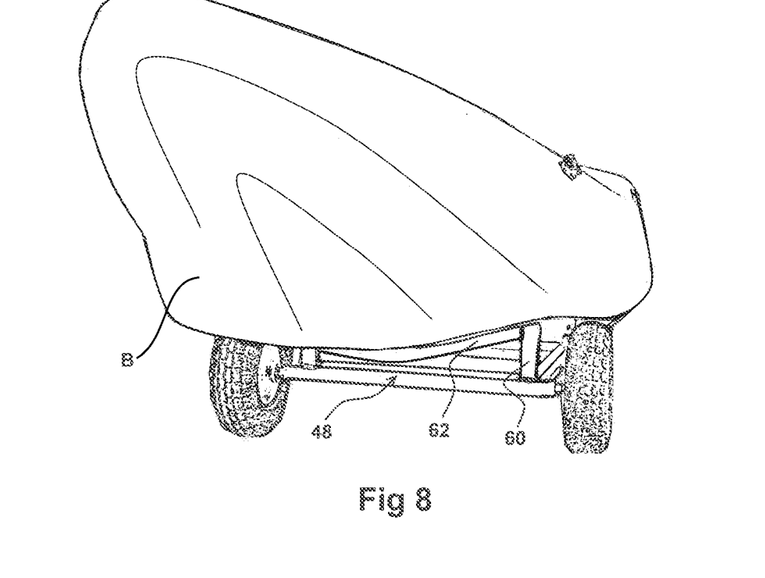
FIG. 8 is an environmental view of the versatile article support device transporting a boat.
Figure 9:
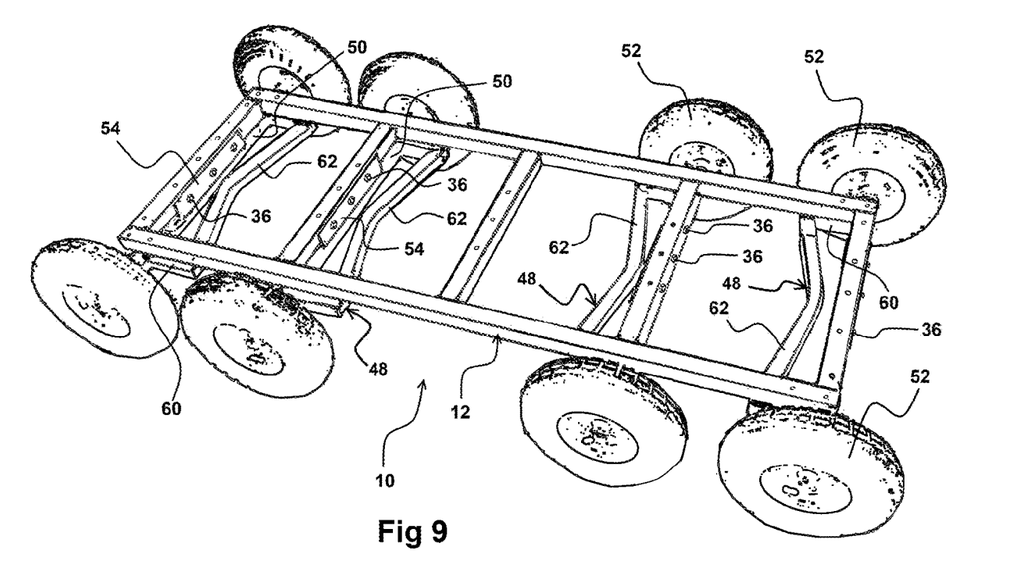
FIG. 9 is a perspective view of the versatile article support device utilizing multiple wheel sets for a heavy load.

Alternately, a wheel set 48 has an axle tube 50 that has a wheel 52 on either end of an axle shaft (not separately illustrated) disposed within the axle tube 50 in the typical way. The wheels 52 may be pneumatic. The outer housing of the axle tube 50 is rectangular in cross-section and has a generally U-shaped receiver 54 attached to one of the faces 56 of the axle tube 50. Attached to an adjoining face 58 of the axle tube 50 is a pair of spaced apart extensions 60. A cross bar 62 extends between the extensions 60 and is bent inwardly toward the axle tube 50. The height of the extensions 60 is less than the cross section of the wheels 52. The wheel set 48 is attached to the versatile article support device 10 by having the receiver 54 receive one of the cross rails 16 of the horizontal frame 12 and thereafter passing appropriate bolts 36 or similar implements through openings 64 on the receiver 54 and corresponding openings 66 on the cross rail 16. As the cross rail 16 has a square cross-section. The receiver 54 can receive its cross rail 16 in a horizontal fashion (the receiver 54 faces toward the horizontal frame 12 or vertically for added support. Additionally, the extensions 60 and cross bar 62 may be facing downwardly so as to be out of the way (as the diameter of each wheel 52 is greater than the height of the extensions 60, the wheels 52 provide sufficient ground clearance) or the wheel set 48 can be flipped so that the extensions 60 and cross bar 62 face upwardly so as to be able to receive an appropriate item such as the illustrated boat B. As seen in FIG. 3, removal of the wheels 50 from the axle tube 50, allows the wheel set to act as a landing skid.

One or more base plates 68 can be attached to the horizontal frame 12 by passing bolts or similar implements through openings on the base plate 68 and corresponding openings on the horizontal frame 12. The base plate can be used to hold various items and may have cutaways, receptacles, holders, etc., in order to hold various items. Additional base plates 70 can be attached to opposing hinge pin receivers 30 with such base plates 70 attached to the hinge pin receivers by passing an appropriate connector through openings on the base plate 70 and through aligned pin openings 34. Such base plates 70 may have a similar width to the width of the horizontal frame 12 so that such base plates 70 have a cutaway 72 on either side to accommodate the necessary clearance for the riser rails 26. Such upwardly positioned base plates 70 can be used with the lower positioned base plates 68 to work in tandem. For example, the upper base plate 70 and the lower base plate 68 may each have an opening that receives the shaft of a beach umbrella and holds the umbrella therein for usage.

In order to use the versatile article support device 10, the appropriate wheel implement(s) and/or landing skid 46 may be attached to the horizontal frame 12. One or more vertical frames 22 is attached to the horizontal frame 12 as desired. If further desired, one or more base plates are attached in appropriate position. The versatile article support device 10 is loaded as desired and transported via the wheel implement if needed.

Figure 10:
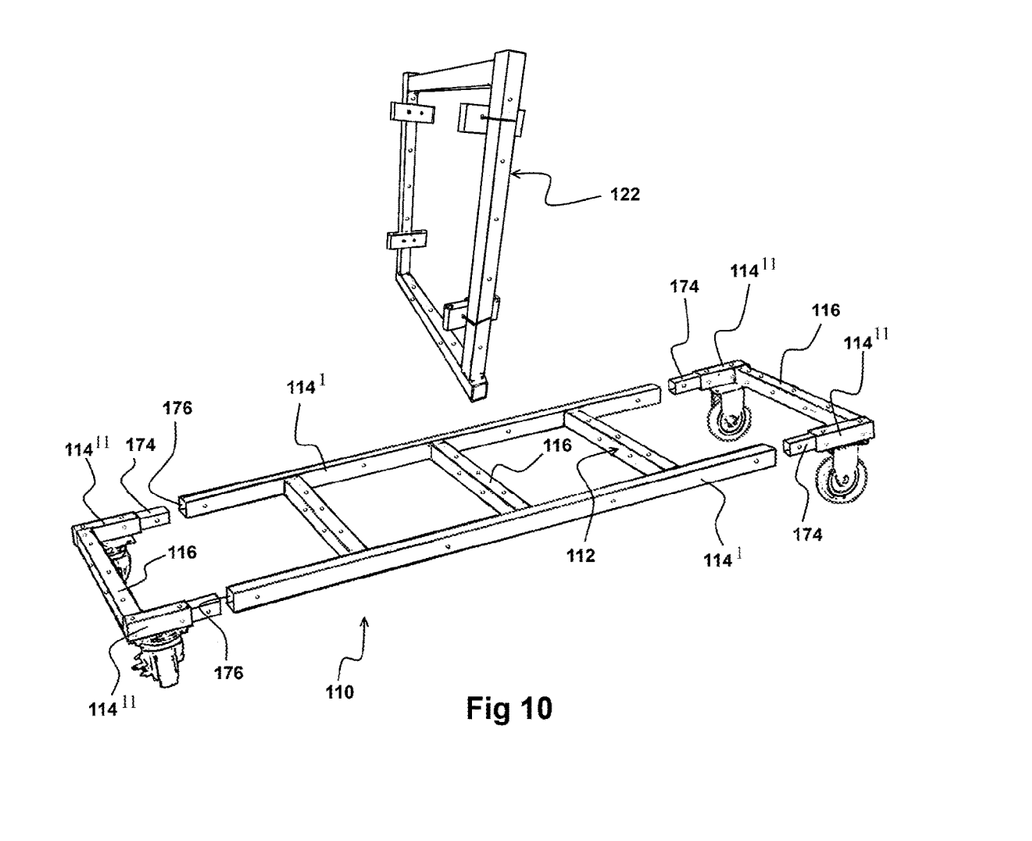
FIG. 10 is an alternate embodiment of the versatile article support device of the present invention.

As seen in FIG. 10, in an alternate embodiment of the versatile article support device 110 of the present invention, the vertical frame 122 may have a pair of side rails joined by cross rails 116 such that the side rails are formed from a main section 114' and an end section 114" that has a male connector 174 that is removably received within a female opening 176 on the main section 114' (or vice versa). One or both ends of the horizontal frame 112 can be so configured. In this way, the ends of the horizontal frame 112 can be removed for ease and compactness of storage and transport. The vertical frame 122 attaches to this horizontal frame 112 in the usual way.

Figure 11:
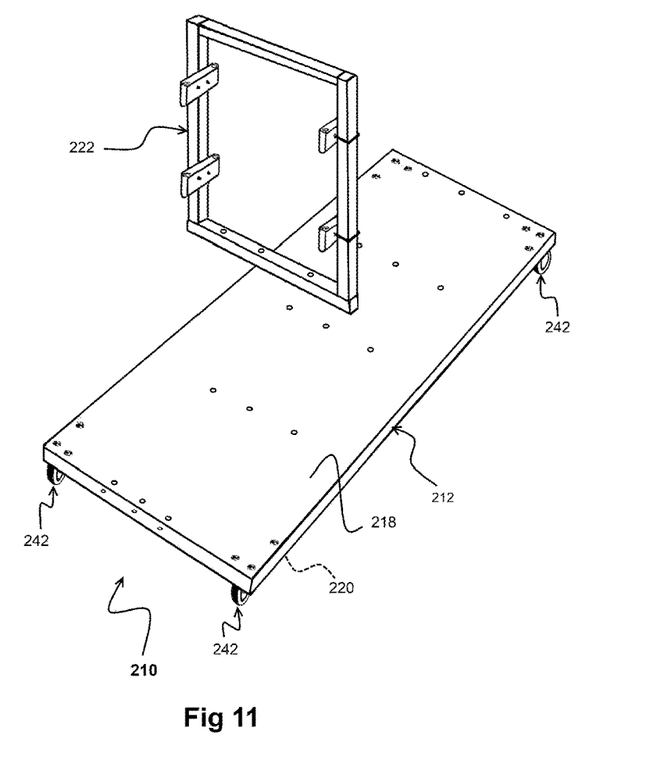
FIG. 11 is another alternate embodiment of the versatile article support device of the present invention using a caster-based wheel implement.
Figure 12:
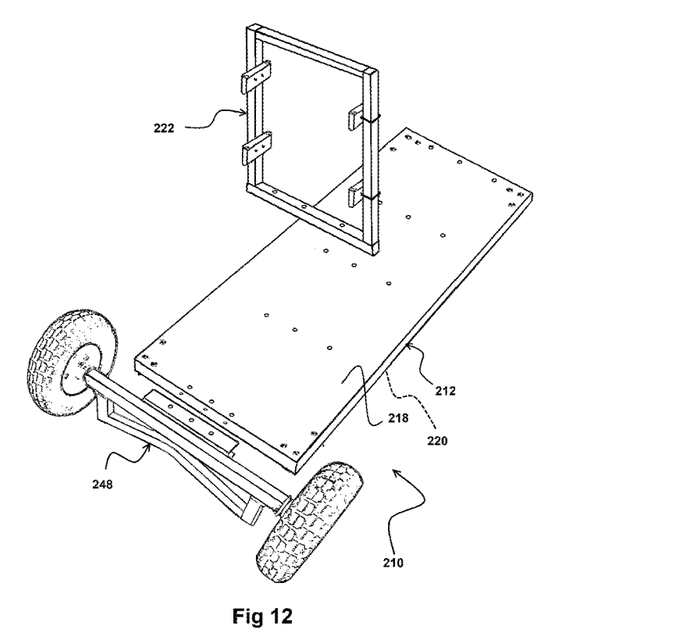
FIG. 12 is another alternate embodiment of the versatile article support device of FIG. 11 using a wheel set-based wheel implement.

As seen in FIG. 11, in an alternate embodiment of the versatile article support rack 210 of the present invention, the horizontal frame 212 may be an essentially flat plate member in lieu of being formed as a series of parallel and perpendicular rails connected together. The vertical frame 222 is attached to an upper surface 218 of the horizontal frame 212 while caster assemblies 242 may be attached to appropriate locations of the lower surface 220 of the horizontal frame 212 or, as seen in FIG. 12, a wheel set 248 can be attached to an end of the horizontal frame 212.

While the invention has been particularly shown and described with reference to an embodiment thereof, it will be appreciated by those skilled in the art that various changes in form and detail may be made without departing from the spirit and scope of the invention.

I claim:

1. A rack comprising:
    a horizontal frame having an upper surface and a corresponding lower surface, the horizontal frame formed by a pair of coextensive side rails joined by a series of transverse cross rails;
    a vertical frame having a base rail and a first riser rail extending upwardly from the base rail and a second riser rail extending upwardly from the base rail coextensively with the first riser rail, such that the base rail is attached to the upper surface of the horizontal frame, the vertical frame also having a top rail that joins the first riser rail and the second riser rail, the base rail of the vertical rail attached directly to one of the cross rails of the horizontal frame;
    a first of hinge pin receiver having a first opening and a second opening, the first hinge pine receiver attached to the first riser rail such that the first riser rail is located between the first opening and the second opening; and
    a second of hinge pin receiver having a third opening and the fourth opening, the second hinge pin receiver attached to the first riser rail, below the first hinge pin receiver, such that the first opening of the first hinge pin receiver and the third opening of the second hinge pin receiver align with one another so that a first axis passes longitudinally through the aligned first opening and the third opening, the first axis also parallel with the pair of risers, and such that the second opening of the first hinge pin receiver and the fourth opening of the second hinge pin receiver align with one another so that a second axis passes longitudinally through the aligned second and the fourth opening, the second axis also parallel with the pair of risers.

2. The rack as in claim 1 further comprising a wheel implement removably attached to the lower surface of the horizontal frame.

3. The rack as in claim 2 wherein the wheel implement comprises:
    a first caster attached to the first side rail; and
    a second caster attached to the second side rail directly across from the first caster.

4. The rack as in claim 2 wherein the wheel implement comprises:
    an axle tube attached to the horizontal frame;
    a first wheel rotatably attached at a first end of the axle; and
    a second wheel rotatably attached at a second end of the axle.

5. The rack as in claim 4 further comprising;
    a pair of extensions rising upwardly from the axle; and
    a cross bar extending between the pair of extensions and bent inwardly toward the axle.

6. The rack as in claim 2 wherein the wheel implement comprises:
    an axle tube;
    a U-shaped receiver attached to the axle tube such that the axle tube is received by the horizontal frame in fixed position;
    a first wheel rotatably attached at a first end of the axle; and
    a second wheel rotatably attached at a second end of the axle.

7. The rack as in claim 6 further comprising;
    a pair of extensions rising upwardly from the axle; and
    a cross bar extending between the pair of extensions and bent inwardly toward the axle.

8. The rack as in claim 7 wherein the receiver and the cross bar are radially offset from one another by 90 degrees.

9. The rack as in claim 2 wherein the wheel implement comprises either a first caster attached to the first side rail and a second caster attached to the second side rail directly across from the first caster or an axle attached to one of the cross rails with a first wheel rotatably attached to a first end of the axle and a second wheel rotatably attached to a second end of the axle.

10. The rack as in claim 1 wherein the horizontal frame is made from a first section and a second section removably attached to the first section.

11. The rack as in claim 1 further comprising a first base plate removably attached to the upper surface of the horizontal frame.

12. The rack as in claim 11 further comprising a second base plate removably attached to either the first hinge pin receiver or the second hinge pin receiver.

13. The rack as in claim 1 further comprising a base plate removably attached to either the first hinge pin receiver or the second hinge pin receiver.

14. A rack comprising:
    a horizontal frame having an upper surface and a corresponding lower surface, the horizontal frame formed by a pair of coextensive side rails joined by a series of transverse cross rails;
    a vertical frame having a base rail and a first riser rail extending upwardly from the base rail and a second riser rail extending upwardly from the base rail coextensively with the first riser rail, such that the base rail is attached directly to one of the cross rails on the upper surface of the horizontal frame, the vertical frame also having a top rail that joins the first riser rail and the second riser rail;

a first of hinge pin receiver having a first opening attached to the first riser rail; and a second of hinge pin receiver having a second opening attached to the first riser rail, below the first hinge pin receiver, such that first opening of the first hinge pin receiver and the second opening of the second hinge pin receiver align with one another so that a first axis passes longitudinally through the aligned first opening and the second opening, the first axis also parallel with the pair of risers, the first hinge pin receiver and the second hinge pin receiver are attached to the first riser rail so as to be positioned between the first riser rail and the second riser rail.

15. The rack as in claim 14 wherein the first hinge pin receiver has a third opening such that the first rail is located between the first opening and the third opening and the second hinge pin receiver has a fourth opening such that the third opening of the first hinge pin receiver and the fourth opening of the second hinge pin receiver align with one another so that a second axis passes longitudinally through the aligned third opening and the fourth opening, the second axis also parallel with the pair of risers.

16. The rack as in claim 14 further comprising a wheel implement removably attached to the lower surface of the horizontal frame.

17. The rack as in claim 16 wherein the wheel implement comprises:
   a first caster attached to the lower surface of the horizontal frame; and
   a second caster attached to the lower surface of the horizontal directly across from the first caster.

18. The rack as in claim 16 wherein the wheel implement comprises:
   an axle tube attached to the horizontal frame;
   a first wheel rotatably attached at a first end of the axle; and
   a second wheel rotatably attached at a second end of the axle.

19. The rack as in claim 18 further comprising;
   a pair of extensions rising upwardly from the axle; and
   a cross bar extending between the pair of extensions and bent inwardly toward the axle.

\* \* \* \* \*